United States Patent [19]
Miyakoshi et al.

[11] Patent Number: 5,828,795
[45] Date of Patent: Oct. 27, 1998

[54] SEALING DEVICE FOR USE IN A MOTOR

[75] Inventors: Toshihiko Miyakoshi; Masato Gomyo; Toshihiro Kobayashi; Masamichi Hayakawa; Hirofusa Shirai; Kenji Hanabusa, all of Nagano, Japan

[73] Assignee: Sankyo Seiki Mfg. Co., Ltd., Nagano-ken, Japan

[21] Appl. No.: 937,389

[22] Filed: Sep. 25, 1997

Related U.S. Application Data

[63] Continuation of Ser. No. 438,953, May 12, 1995, abandoned.

[30] Foreign Application Priority Data

| May 31, 1994 | [JP] | Japan | 6-140958 |
| May 13, 1994 | [JP] | Japan | 6-100263 |
| May 19, 1994 | [JP] | Japan | 6-129559 |
| Sep. 6, 1994 | [JP] | Japan | 6-238542 |

[51] Int. Cl.$^6$ ..................................................... F16C 33/82
[52] U.S. Cl. ............................. 384/133; 384/136; 277/80
[58] Field of Search ....................................... 384/133, 478, 384/134, 132, 136; 277/80

[56] References Cited

U.S. PATENT DOCUMENTS

| 4,077,508 | 3/1978 | Pedersen | 277/80 |
| 4,424,974 | 1/1984 | Mitsuya et al. | 277/80 |
| 5,238,254 | 8/1993 | Takii et al. | 384/133 |

*Primary Examiner*—Lenard A. Footland
*Attorney, Agent, or Firm*—McAulay Nissen Goldberg Kiel & Hand, LLP

[57] ABSTRACT

A sealing device for use in a motor. The motor, which maintains a shaft: and a frame that are interconnected by a bearing, includes a magnetic-fluid-seating device and a collecting device. The magnetic-fluid-sealing device seals the bearing with a magnetic fluid to prevent particles and fluids from escaping the bearing, whereas, the collecting device collects any particles and fluids which may escape the magnetic-fluid-sealing device.

20 Claims, 11 Drawing Sheets

SEALING DEVICE FOR USE IN A MOTOR

This is a continuation application of Ser. No. 08/438,953, filed on May 12, 1995, abandoned.

BACKGROUND

A) Field of the Invention

The present invention relates to a sealing device for use in a motor, and more particularly to a sealing device which includes a magnetic-fluid-sealing apparatus and a collecting apparatus.

B) Description of Related Art

Numerous sealing devices for use with bearings have previously been proposed. For example, a combined use of a magnetic-fluid seal with magnetic-fluid bearings is proposed in Japanese Patent Application KOKAI No. Hei 1-320314. This device has shown a certain sealing effect which prevents the escape of dust from the bearings. However, the proposed device has been unable to prevent the magnetic fluid from scattering or flowing out of the magnetic-fluid seal during rotation at high speeds or when placed under an influence of heat or impact.

In another example, Japanese Patent Publication No. Sho 60-48668 forms an oil-repellent film on a surface of a rotary shaft or yoke in a motor to retain a magnetic fluid in a magnetic-fluid seal. Specifically, referring to FIG. 1, a magnetic-fluid seal is shown in which a magnetic fluid 1 is provided for forming a seal in a space between a rotary shaft 2 and a pair of yokes 3. The yokes 3 are secured to a housing 4 and have placed between them a permanent magnet 5 which faces the rotary shaft 2. Oil-repellent films 6, formed from a fluorine compound such as Teflon, are placed on surfaces of the yokes 3 and an adjacent surface of the rotary shaft 2. The oil-repellent films 6 prevent the scattering or outflow of the magnetic fluid 1 by holding the magnetic fluid 1 in place. The oil-repellent films 6 also impart an improved resistance to pressure on the magnetic fluid 1.

Figure 1:
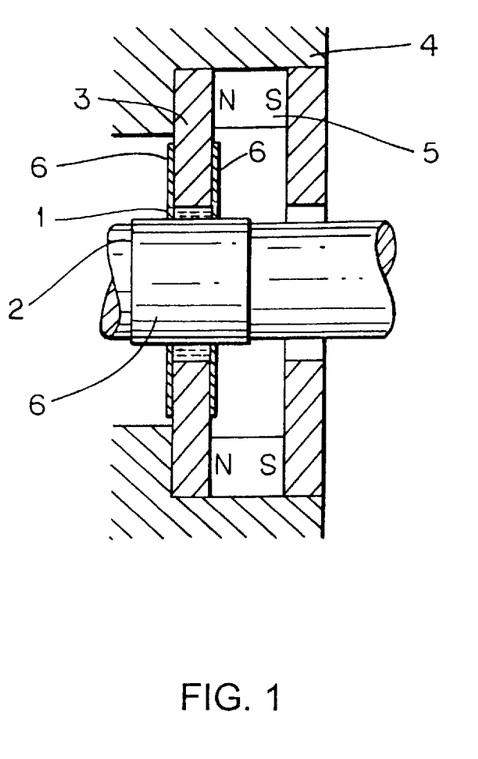
FIG. 1 illustrates a sectional view of a known device.

However, the device described in Japanese Patent Publication No. Sho 60-48668 has certain drawbacks. Particularly, if any of the magnetic fluid 1 scatters as a result of an impact, vibration, change in pressure, or change in temperature, and adheres to a surface of the oil-repellent films 6, it will be further dispersed due to winds produced from centrifugal forces or rotation of the shaft 2. This same drawback is present when the magnetic-fluid seal shown in FIG. 1 is used with a ball bearing. Moreover, if a device as described in FIG. 1, allows the scattering of magnetic fluid, oil, or particles from the bearings, they are likely to contaminate, for example, a surface of a disk in a hard disk drive motor. This would cause critical problems including recording error, reproducing error, and head crash.

Figure 2:
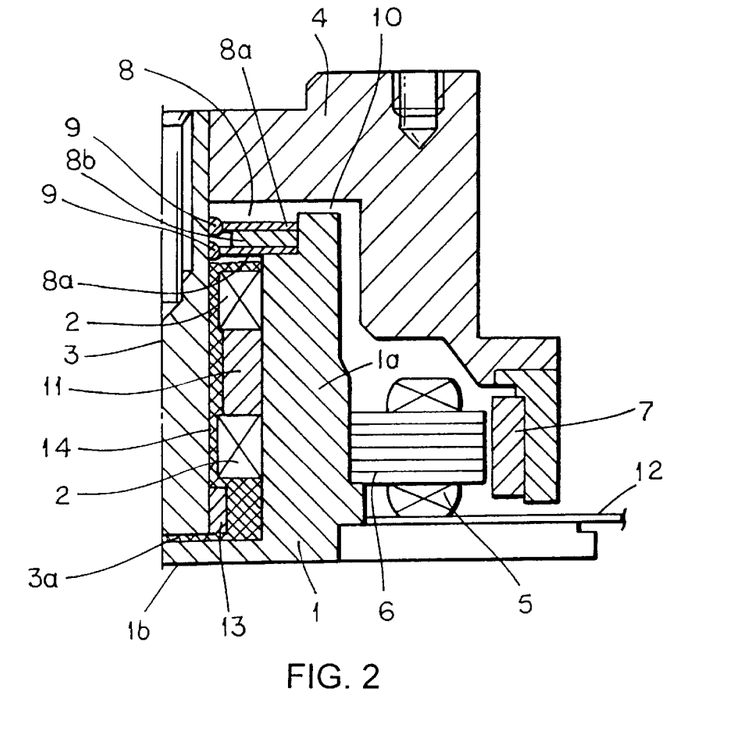
FIG. 2 illustrates a sectional view of a known device.

Japanese Laid-Open Patent Publication No. 62-155327 and Japanese Laid-Open Patent Utility Model Publication No. 62-202526 propose other known configurations for sealing a bearing device which uses a magnetic fluid. Referring to FIG. 2, a fixed motor housing or frame 1 has an integral bearing holder 1a which extends in a vertical direction and is cylindrical in shape. The frame 1, with the bearing holder 1a, has a concave shape and is further defined to have a closed end on its bottom side and an open end on its upper side. A stator core 6 is fixed onto an outer peripheral surface of the bearing holder 1a and a coil 5 is wound on the stator core 6.

Two radial-slide bearings 2, with a bearing collar 11 sandwiched therebetween, are securely fitted to an inner periphery of the bearing holder 1a to receive a center shaft 3. A dynamic pressure groove, which has for example a herringbone shape, is formed in either an outer peripheral surface of the center shaft 3 or an inner peripheral surface of each of the radial-slide bearings 2. A magnetic fluid 14 is filled in a clearance or slide region between the center shaft 3 and the radial-slide bearings 2. Under this arrangement, a radial dynamic pressure is developed between the center shaft 3 and the radial-slide bearings 2 so as to prevent radial vibration of the center shaft 3 when it is rotated within the radial-slide bearings 2.

A thrust plate 1b, which forms a bottom of the frame 1, maintains a face-to-face relationship with end surface 3a of the center shaft 3. A dynamic pressure groove is formed in either the thrust plate 1b or the end surface 3a of the center shaft 3. The magnetic fluid 14 is also filled in a clearance or slide region between the end surface 3a of the center shaft 3 and the upper surface of the thrust plate 1b. This results in a thrust dynamic pressure being developed between the end surface 3a of the center shaft 3 and the upper surface of the thrust plate 1b to urge the center shaft 3 toward the open end of the frame 1.

A drive magnet 7 is fixed to an inner periphery of a hub 4 and is positioned to face the stator core 6. The stator core 6 has a magnetic center which is offset from that of the drive magnet 7 to generate a magnetic attraction which will urge the center shaft 3 toward the closed end of the frame 1. The magnetic attraction, coupled with the above-described thrust dynamic pressure, keeps the center shaft 3 well balanced and free from vibration when it is rotated on the thrust plate 1b.

The hub 4 is fit onto an end of the center shaft 3 adjacent to the open end of the frame 1 and is shaped to cover the stator core 6 and the coil 5. Although not shown, a disk is loaded on an outer periphery of the hub 4. Operationally, when a predetermined drive voltage is applied from an external power source to the coil 5, through a flexible board 12, the hub 4 is rotated.

A passage 10 is defined to provide a communication between the interior and exterior of the bearing holder 1a. A magnetic-fluid seal 8 is present in the passage 10 adjacent to the upper end of the bearing holder 1a. The magnetic-fluid seal 8 includes a magnet 8b, and a pair of pole pieces 8a which are adapted to sandwich axial ends of the magnet 8b. The pole pieces 8a form a magnetic circuit with magnetic fluids 9 that are present between inner peripheral surfaces of the pole pieces 8a and an outer peripheral surface of the center shaft 3. The magnetic-fluid seal 8 is generally effective to prevent leakage of the magnetic fluid 14 which is filled in a slide region within the bearing holder 1a of the bearings 2.

Figure 3:
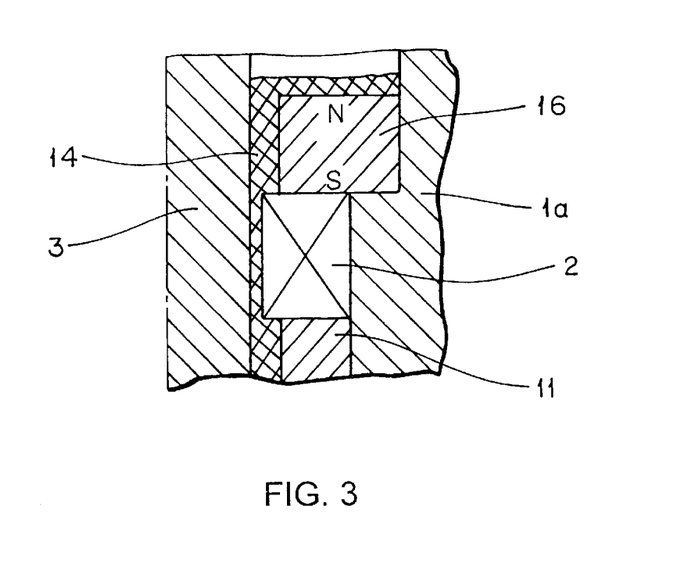
FIG. 3 illustrates a sectional view showing another example of the known magnetic-fluid-holding structure shown in FIG. 2.

FIG. 3 shows another type of magnetic seal used to prevent a leakage of the magnetic fluid 14 toward the open end of the frame 1. As shown in FIG. 3, in lieu of the magnetic-fluid seal 8 shown in FIG. 2, a magnet 16 may be placed on the radial-slide bearing 2 adjacent to the open end of the frame 1. The magnet 16, having axially opposite magnetic poles, provides an open magnetic field to hold the magnetic fluid 14 in place.

With respect to the devices shown in FIGS. 2 and 3, also provided is a stopper 13 which is attached to the center shaft 3 to prevent the center shaft 3 from escaping the frame 1.

Being that the motors shown in FIGS. 2 and 3 must be used in a clean air environment, it is imperative to prevent the magnetic fluid 14 from leaking if the motors are subjected to vibration, shock, and centrifugal forces, or if the motor's orientation is changed. However, in certain environments, the devices shown in FIGS. 2 and 3 become ineffective at controlling the magnetic fluid 14.

For example, when the volume of the magnetic fluid 14 in the bearing holder 1a changes due to variations in atmospheric pressure, temperature, or part sizes, the arrangements shown in FIGS. 2 and 3 become substantially less effective at controlling the magnetic fluid 14. In particular, when the devices shown in FIGS. 2 and 3 are shipped by airplane, the magnetic fluid 14 is likely to leak from the device due to a substantial change in atmospheric pressure and temperature.

OBJECTS AND SUMMARY OF THE INVENTION

It is accordingly an object of the invention to provide a sealing device for a motor which avoids leakage difficulties in known motors due to environmental influences and other variations.

In accordance with the invention, a sealing device for use in a motor is provided, where the motor includes a shaft and a frame that are interconnected by a bearing. The sealing device comprises a magnetic-fluid-sealing means for sealing the bearing, and a collecting means for collecting particles and fluids which may escape from the magnetic-fluid-sealing means, where the collecting means is held out of contact with a magnetic fluid used in the magnetic-fluid-sealing means.

In accordance with the invention, a device for sealing bearings is positioned between a rotary body and a stationary body, where the device comprises a pair of yokes, a magnet, a magnetic fluid for sealing the bearings, and a fluid absorber. In this device, the yokes and the magnet are fixed to either the stationary body or the rotary body, the yokes and the magnet are positioned close to one another in an axial direction, the magnetic fluid is prepared by dispersing a magnetic powder in an oil, and the fluid absorber is held out of contact with the magnetic fluid.

In accordance with the invention, a sealing device for use in a motor with a stationary member and a revolving member is provided, where the sealing device comprises a radial bearing which is fixed to one of the stationary member and the revolving member and is adapted to rotatably support the revolving member, a magnetic fluid which is filled in a slide region of the radial bearing, a magnet which is mounted to one of the stationary member and revolving member and is located closer to an open end of the motor than the radial bearing, a magnetic body which is mounted to one of the stationary member and revolving member such that it is positioned to radially face the magnet, and a magnetic-fluid absorption-member which is positioned in a passage through which the radial bearing communicates to an environment outside of the motor and is located closer to the open end of the motor than the radial bearing and is kept out of contact with the magnetic fluid. In this device, the magnet and magnetic body collectively form a magnetic circuit which produces an axial-magnetic-flux-density gradient in a space between the magnet and magnetic body which increases unidirectionally in a direction away from the open end of the motor.

Additional objects and advantages of the invention will be apparent from the foregoing general description and following detailed description and drawings. It is to be understood that the descriptions are exemplary and explanatory only and are not restrictive of the invention as claimed.

BRIEF DESCRIPTION OF THE DRAWINGS

The accompanying drawings are included to provide an understanding of the invention and constitute a part of the specification.

DETAILED DESCRIPTION OF THE INVENTION

Reference will now be made in detail to numerous embodiments of the invention as illustrated in the accompanying drawings.

Figure 4:
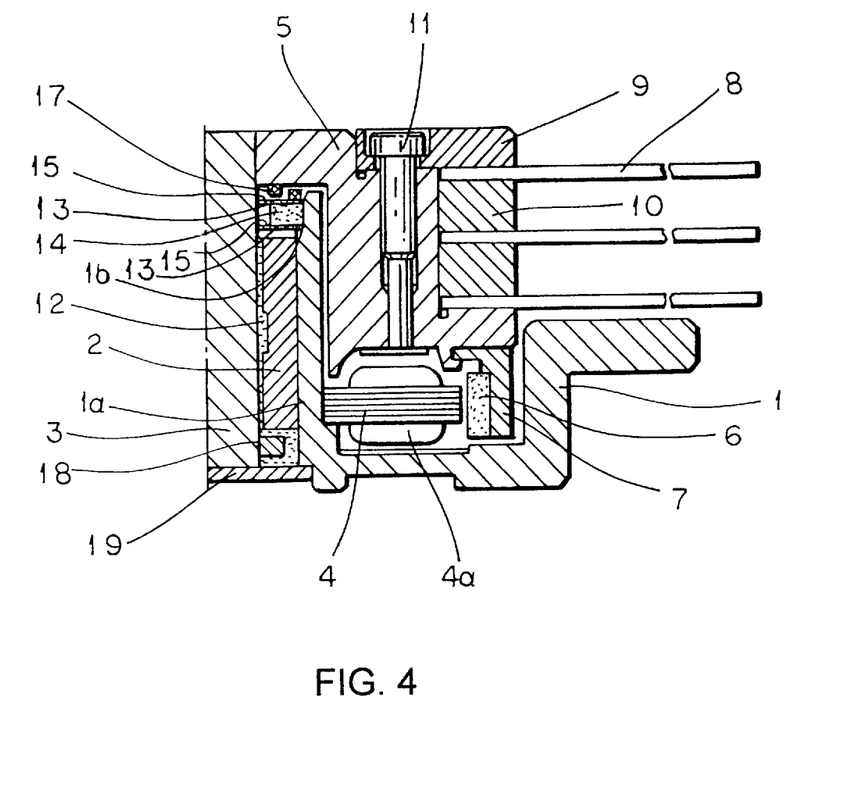
FIG. 4 illustrates a sectional view of the invention according to a first embodiment.

FIG. 4 is a sectional view of a first embodiment of the invention used with a dynamic-pressure fluid bearing. A frame 1 is secured to a hard disk drive which is not shown. The frame 1 has a central portion 1a to which a bearing 2 is secured. A rotary shaft 3 extends through the bearing 2 with a magnetic fluid 12 held therebetween for producing a dynamic pressure. The rotary shaft 3 is held in position by a thrust bearing 19 which is press-fit on the frame 1 and a retaining ring 18 which is secured about the rotary shaft 18 and is adjacent to its lower end. A plurality of disks 8, which are spaced apart form one another by spacers 10, are secured by a disk holder 9. The disk holder 9 is secured to an outer periphery of a hub 5. The hub 5 is secured to an upper end of the rotary shaft 3.

A yoke 7 carrying a drive magnet 6 is secured below the hub 5. The yoke faces a yoke 4 which is secured about the cylindrical portion 1a of the frame 1. The yoke 4 is equipped with a coil 4a. In combination, these devices form a motor drive to rotate the plurality of disks 8.

The cylindrical portion 1a has adjacent to its upper end a shoulder 1b in which a pair of yokes 13 are securely fitted to hold a magnet 14. The yokes 13 have inner edges facing the rotary shaft 3. Between the inner edges of the yokes 13 and the rotary shaft 3, is defined a clearance in which a magnetic fluid 15 is held to form a seal along the rotary shaft. The magnetic fluid 15 is an oil-based fluid prepared by dispersing a magnetic powder in oil. The magnetic fluid 15 is held in the clearance between the rotary shaft 3 and the yokes 13 by a magnetic force from the magnet 14.

Oil absorbing members 17 are secured to at least one of a surface of an outer yoke 13 and a surface of the hub 5. The oil absorbing members 17 are formed from an unwoven fabric of polypropylene fibers or a felt of polyethylene or polystyrene. In the event any of the magnetic fluid 15 flows from the clearance, as a result of vibration, impact, temperature elevation, or high-speed rotation, it is collected by oil absorbing members 17 so as not to flow out of the device. The same results are obtained if the oil absorbing materials are placed solely only on either the yoke 13 or hub 5.

Figure 5:
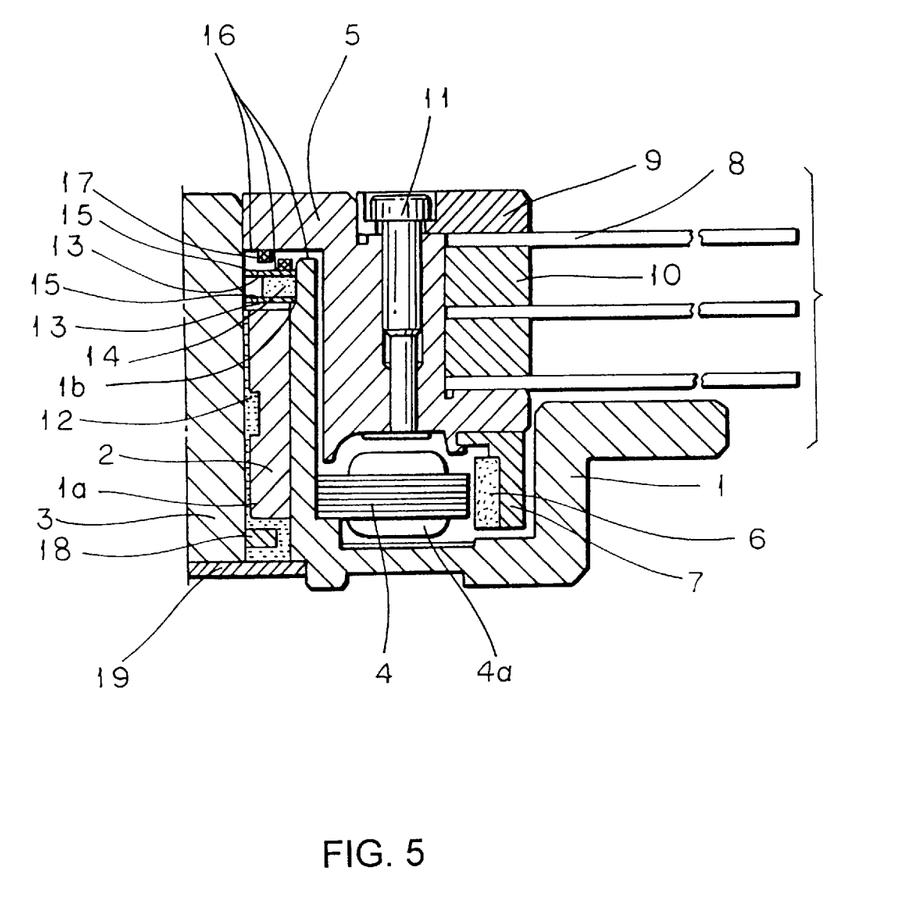
FIG. 5 illustrates a sectional view of the invention according to a second embodiment.

FIG. 5 is a sectional view of a second embodiment of invention used with a dynamic-pressure fluid bearing. In this second embodiment, a device identical in construction to the device shown in FIG. 4 is modified to include a film 16. The film 16, which is an oil-repellent such as a fluorine compound, is formed on a surface of the outer yoke 13, the upper end of cylindrical portion 1a, the rotary shaft 3, and a portion of the surface of the hub 5. The magnetic-fluid seal of the device shown in FIG. 5 has an enhanced oil-retaining capacity as compared to the device shown in FIG. 4, due to the oil-repellent 16 which promotes the concentration of the magnetic fluid 15 about the rotary shaft 3 to prevent its scattering and leakage.

Oil absorbing members 17 are again secured to at least one of a surface of the outer yoke 13 and a surface of the hub 5. The oil absorbing members 17 are formed from an unwoven fabric of polypropylene fibers or a felt of polyethylene or polystyrene. The oil absorbing members 17 are provided to absorb any magnetic fluid 15 which may flow from the clearance as a result of adverse conditions such as vibration, impact, temperature elevation, or high-speed rotation.

Figure 6:
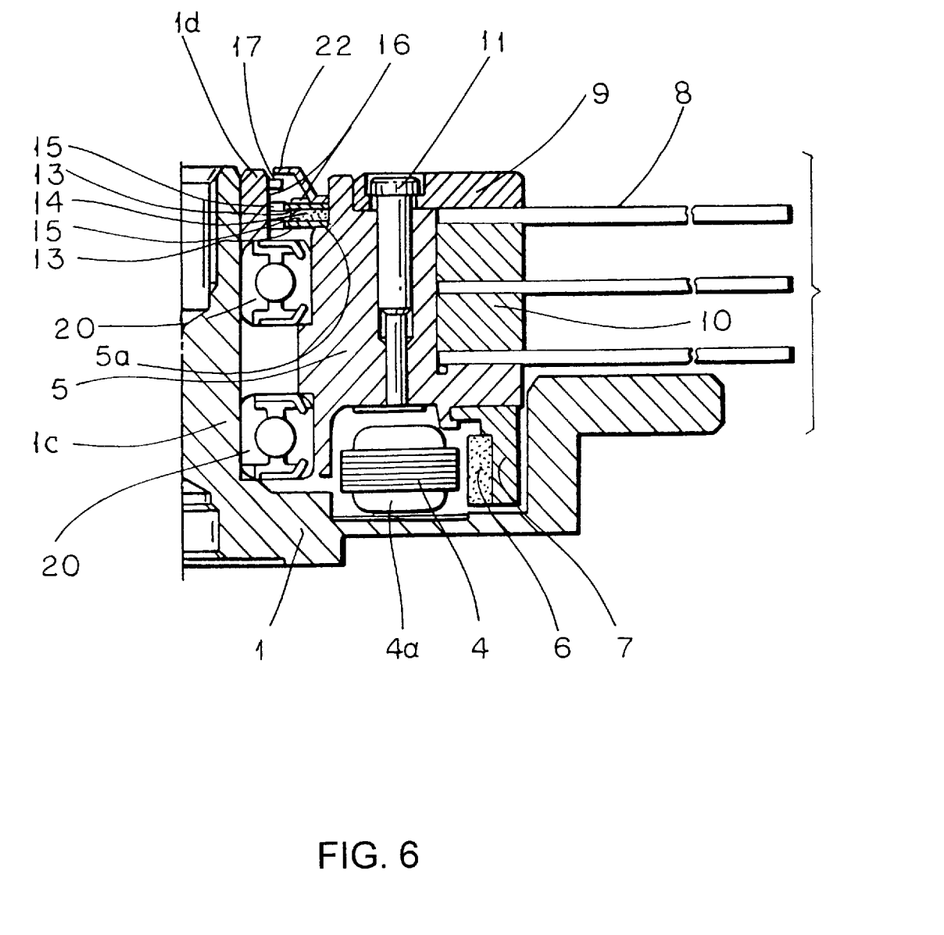
FIG. 6 illustrates a sectional view of the invention according to a third embodiment.

FIG. 6 is a sectional view of a third embodiment of the invention which employs ball bearings. In this embodiment, a frame 1 has a central shaft portion 1c about which two ball bearings 20 are fitted and secured by a holder 1d. A hub is fitted on outer races of the ball bearings 20. A yoke 7 holding a drive magnet 6 is secured to a bottom surface of the hub 5 and faces a yoke 4 secured to the frame 1 and equipped with a coil 4a. In combination, these devices form a motor drive to rotate a plurality of disks 8. The disks 8 are spaced apart from one another by spacers 10 and secured to an outer periphery of the hub 5 by a disk holder 9 and a screw 11.

The hub 5 has a shoulder 5a formed on its inner surface. A pair of yokes 13 are securely fitted in the shoulder 5a and hold a magnet 14. The yokes 13 have inner edges facing the holder 1d which is secured to the shaft portion 1c. Between the inner edges of the yokes 13 and the holder 1d is a clearance in which a magnetic fluid 15 is held to form a seal. A film 16 of an oil repellent, such as a fluoride compound, is formed on a surface of the holder 1d above the magnetic fluid 15 and on a surface of one of the yokes 13. An oil absorbing member 17, which is formed from an unwoven fabric of polypropylene fibers or a felt of polyethylene or polystyrene, is adhesively or otherwise secured to the holder 1d above the film 16. The operation of the device shown in FIG. 6 and described above is similar to that of the device shown in FIG. 5 except for that of the stationary shaft portion 1c and the ball bearings 20.

The oil absorbing member 17, as shown in FIG. 6, is found to more effectively retain the magnetic fluid 15 against leakage if the film 16 is also placed above the oil absorbing member 17 on the holder 1d. It is important to note, however, that the benefits and advantages of the invention described in FIG. 6 are also available through use of the oil absorbing member 17 without the film 16.

Figure 7A:
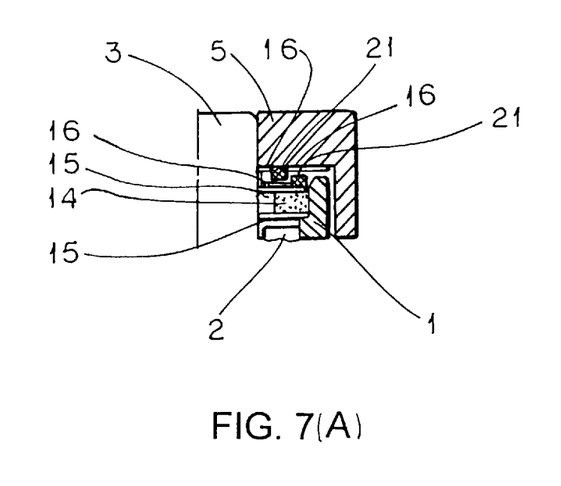
FIGS. 7(A) and 7(B) illustrate fragmentary sectional views of the invention according to fourth and fifth embodiments.
Figure 7B:
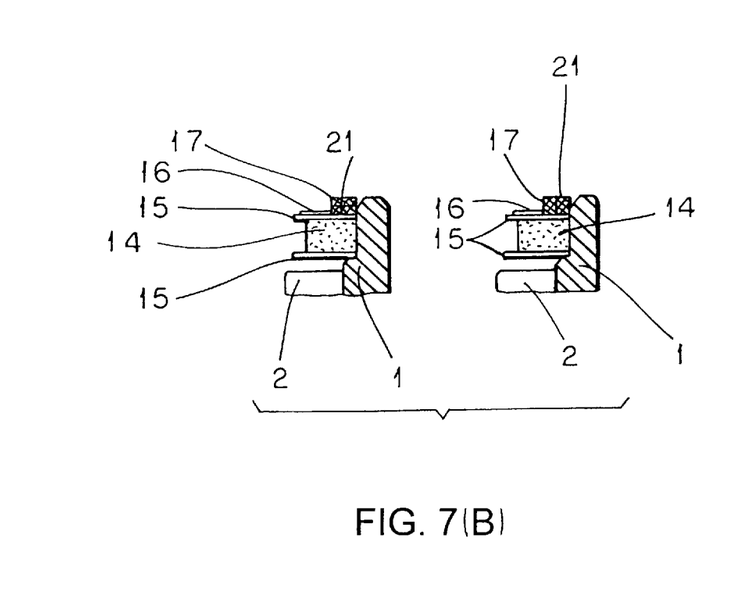

FIGS. 7(A) and 7(B) are fragmented sectional views of fourth and fifth embodiments of the invention. Referring to FIGS. 4 through 6 as described above, oil which collects as a fluid in the oil absorbing members 17 with the passage of time is likely to evaporate or scatter. To overcome this problem, FIG. 7(A) shows a device which uses an absorbing member 21 containing an oil-solidifying agent, such as a poly long-chain acryl acrylate, so that collected oil may be solidified to prevent unwanted evaporation and scatter. FIG. 7(B) shows a device which can further prevent unwanted evaporation or scatter of oil by combining the oil absorbing member 17, as described above, with an absorbing member 21 which contains a solidifying agent.

It is of course to be understood that various changes may be made to the first through fifth embodiments described above without departing from the scope of the invention. For example, it is possible to provide a plurality of magnetic-fluid seals instead of one as previously described. Also, it is possible to use a magnetic fluid as the dynamic pressure fluid in the first embodiment as shown in FIG. 4. It is further possible, again referring to FIG. 4, to form a closed magnetic circuit between the bearing 2 and the rotary shaft 3 to prevent leakage of the magnetic fluid 12, which would also be used as the dynamic pressure fluid, from the bearing 2. This would allow the bearing 2 itself to function as a magnetic-fluid seal and attain the results of the invention so long as the oil absorbing members 17 are provided near the bearing 2 as in the device of FIG. 4.

Additionally, with respect to the first through fifth embodiments, the oil absorbing members 17 can alternatively be designed to adsorb the oil. As long as members 17 perform a sorptive function, either through absorption or adsorption, they will retain their effectiveness.

There are many advantages associated with the devices described in the first through fifth embodiments.

The oil-repellent films 16, as described above, make it possible to minimize leakage and scattering of any magnetic fluid or oil which may result from adverse conditions such as impact, vibration, changes in temperature, or changes in pressure. However, in the event any magnetic fluid scatters from the seal as a result of these adverse conditions, the magnetic fluid will be captured for a number of reasons. First, the magnetic fluid scattering in a vicinity of a yoke defining the magnetic seal will be drawn back to the seal by a magnetic force. Second, the magnetic fluid scattering in a vicinity of the oil absorbing members will be collected. Lastly, the magnetic fluid which remains on any of the surfaces treated with the oil repellent will be either drawn back into the seal, or collected by the oil absorbing members as a result of pressures from wind produced by centrifugal forces or rotation.

As a result of the oil absorbing members described in the first through fifth embodiments, which operate as a means for collecting fluids, it is possible to prevent the magnetic fluid from escaping.

The inventions described in the first through fifth embodiments are reliable for use with any motor of the type in which an uncontaminated environment is required. For example, a motor for a polygonal mirror in a laser beam printer, a motor for a hard disk drive, or a motor for a photomagnetic recording apparatus.

Figure 8:
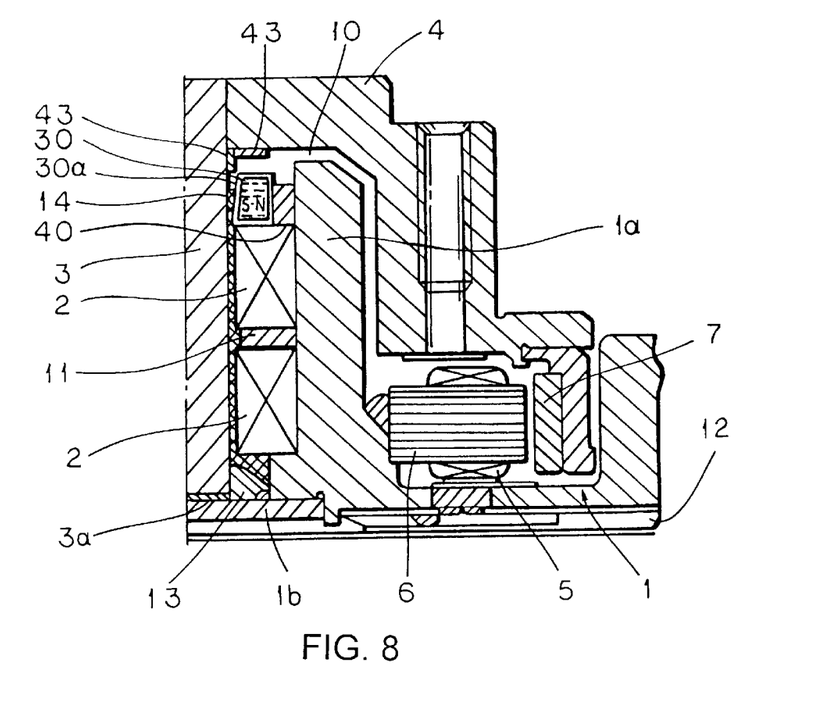
FIG. 8 illustrates a transverse sectional view of the invention according to a sixth embodiment.
Figure 9:
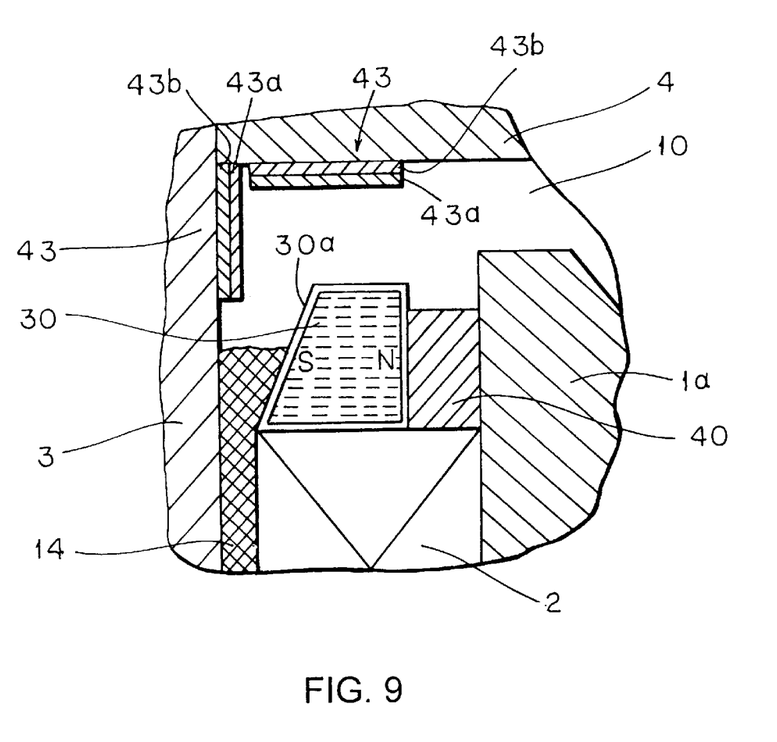
FIG. 9 illustrates an enlarged view of a principal part of the device shown in FIG. 8.

FIGS. 8 and 9 are sectional views of a device according to a sixth embodiment of the invention which is used for, for example, with a motor for use in a hard disk drive. FIG. 9 is of particular interest being that it shows an enlarged view of a principal part of the device shown in FIG. 8.

Referring to FIGS. 8 and 9, a center shaft 3 and a two radial-slide bearings 2 are provided, where the upper radial-slide bearing 2 is positioned adjacent to an open end of a frame 1. The center shaft 3 and radial-slide bearings 2 are both made of a magnetic material to accommodate a magnet 30 which is placed on one end of the radial-slide bearing 2 adjacent to the open end of the frame 1. The magnet 30 is designed such that it has diametrically opposite magnetic poles. The magnet 30 is held by a retainer 40. The retainer 40 is fixed between the radial-slide bearing 2 adjacent to the open end of the frame 1 and a periphery of the magnet 30. The magnet 30, the center shaft 3, the radial-slide bearing 2 adjacent to the open end of the frame 1, and the retainer 40 collectively form a magnetic circuit.

The magnet 30 has a surface 30a in a face-to-face relationship with the center shaft 3. The surface 30a of the magnet 30 is inclined toward an outer periphery of the center shaft 3. That is, the magnet 30 is inclined in a direction away from the open end of the frame 1 or, in other words, a downward direction.

Figure 16:
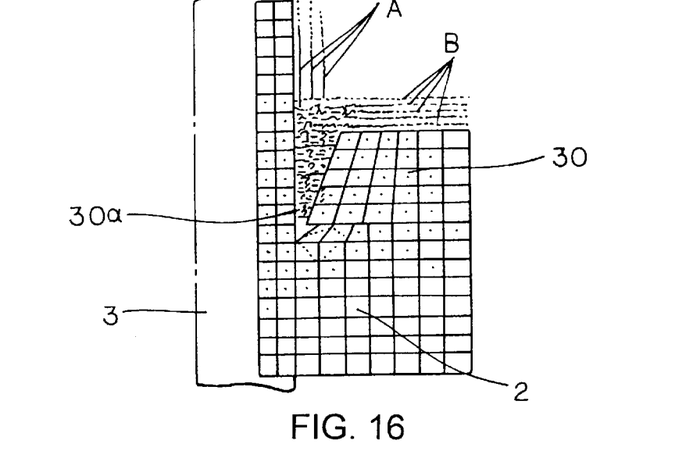
FIG. 16 illustrates magnetic flux in magnets and magnetic bodies used in the sixth to tenth embodiments.
Figure 17:
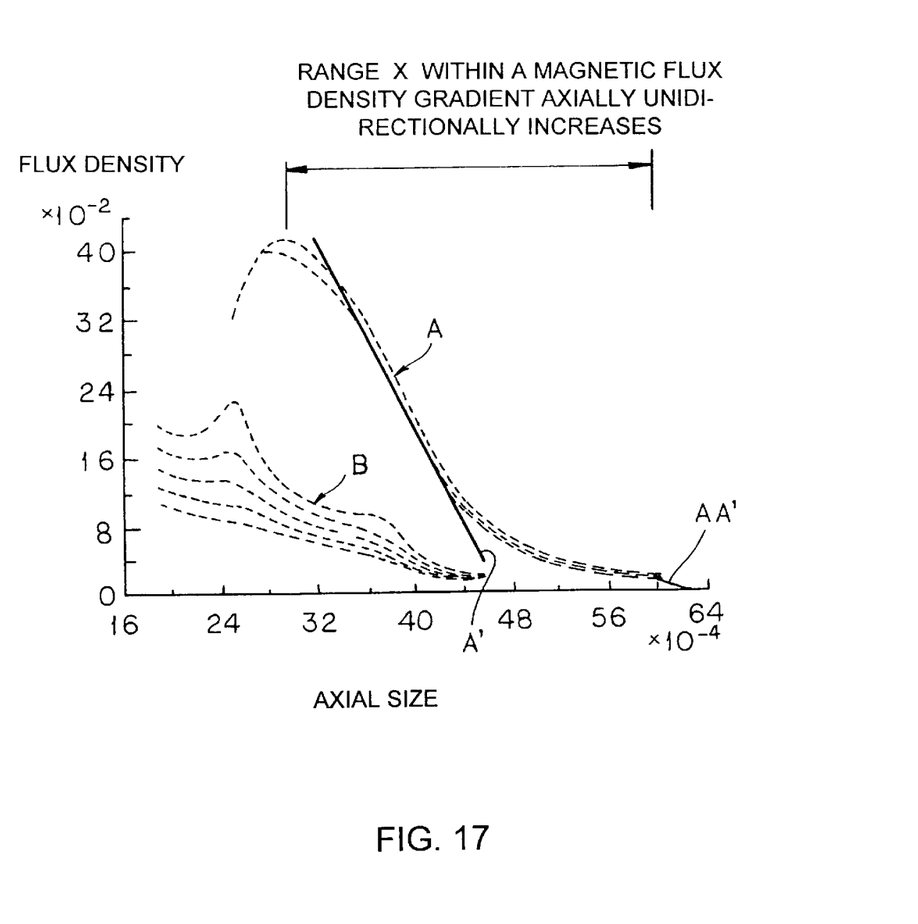
FIG. 17 illustrates a graph showing a density distribution of magnetic flux indicated by reference numerals A and B in FIG. 16.

Referring to FIGS. 16 and 17, by forming a magnetic circuit between the inclined surface 30a of the magnet 30 and the center shaft 3, a magnetic flux A in the space between the magnet 30 and the center shaft 3 and a magnetic flux B in the space around one end of the magnet 30 adjacent to the open end of the frame have an axially-distributed density.

An axial-magnetic-flux-density gradient in the space between the magnet 30 and the center shaft 3 is present within a Range X as is specifically defined in FIG. 17. The axial-magnetic-flux-density gradient increases unidirectionally in a direction away from the open end of the frame 1.

The magnetic circuit formed by the magnet 30, the center shaft 3, the radial-slide bearing 2 adjacent to the open end of the frame 1, and the retainer 40 provide the axial-magnetic-flux-density gradient in the space between the center shaft 3 and the magnet 30 which increases unidirectionally in a direction away from the open end of the frame 1. The axial-magnetic-flux-density is designed to retain the magnetic fluid 14 under adverse circumstances. Specifically, referring to FIG. 17, a magnetic-flux-density gradient A' provides a magnetic force required to safely retain the magnetic fluid 14 if the level of the magnetic fluid 14 is subject to changes in atmospheric pressure, temperature, part sizes, or changes occurring when a required amount of magnetic fluid is not present. Also, a magnetic-flux-density gradient AA' provides a magnetic force required to safely return the magnetic fluid 14 if the device is subject to vibration, shock or centrifugal forces, or if an orientation of the device is changed to cause the magnetic fluid 14 to flow out of the device. The ability to retain the magnetic fluid 14 under these circumstances is due to the fact that a relatively large unidirectional-magnetic-flux-density gradient is present at a location remote from the magnet 30.

By minimizing the amount of magnetic fluid 14 which flows out of the device, it is possible to reduce contamination of elements located outside of the device. This arrangement is effective particularly when the device is shipped by an airplane where a sudden change in atmospheric pressure and temperature occurs.

As described above, the radial-slide bearing 2 adjacent to the open end of the frame 1, the retainer 40, and the center shaft 3, are made of a magnetic material to collectively form a magnetic circuit with the magnet 30. This arrangement, unlike the arrangement where the magnetic circuit is formed only by the center shaft 3 and the magnet 30, can more effectively hold the magnet 30.

The unidirectional-magnetic-flux-density gradient is preferably as long and sharp as possible. Also, the volume of a space within which the magnetic fluid is contained is preferably as large as possible. Such a preferred unidirectional-magnetic-flux-density gradient and volume can readily be obtained by changing the angle of inclination of the magnet 30.

A passage 10 is formed to provide a communication between the radial-slide bearings 2 and the outside of the device. Magnetic-fluid absorption members 43 are placed in this passage 10 at a location above the radial-slide bearing 2 and kept out of contact with the magnetic fluid 14. That is, two magnetic-fluid absorption members 43 are attached to the outer peripheral surface of the center shaft 3 above the magnet 30 and to a wall of a hub 4 at a location adjacent to the outer peripheral surface of the center shaft 3.

The two magnetic-fluid-absorption members 43 are in the form of an unwoven fabric made, for example, from polypropylene, polyester, polyethylene, polystyrene, nylon, polyurethane, and vinyl chloride. As shown in FIG. 9, each magnetic-fluid-absorption member 43 includes an outer magnetic-fluid-absorption layer 43a and an inner adhesive layer 43b.

Thus, even if the magnetic fluid 14 leaks from the device, notwithstanding the magnetic attraction resulting from the unidirectional-magnetic-flux-density gradient, the magnetic-fluid-absorption members 43 will absorb that magnetic fluid 14 to prevent any leakage.

There are many advantages of the device described in the sixth embodiment. First, the unidirectional-magnetic-flux-density gradient increases in a direction opposite to the open end of the frame 1 and provides a magnetic force to retain the magnetic fluid 14 if the level of the magnetic fluid 14 is changed due to a variations in atmospheric pressure, temperature, part sizes, or when a required amount of magnetic fluid 14 not being present. Second, if the device is subject to vibration, shocks, centrifugal forces, or changes in orientation, the unidirectional-magnetic-flux-density gradient provides a magnetic force sufficient to retain the magnetic fluid 14 which would normally leak from the device. Third, notwithstanding the magnetic attraction resulting from the unidirectional-magnetic-flux-density gradient, if the magnetic fluid 14 leaks that magnetic fluid will be absorbed by the magnetic-fluid-absorption members 43 and will in no way escape from the device. For these reasons, it is therefore possible to reduce contamination outside of the device described by the sixth embodiment.

Figure 10:
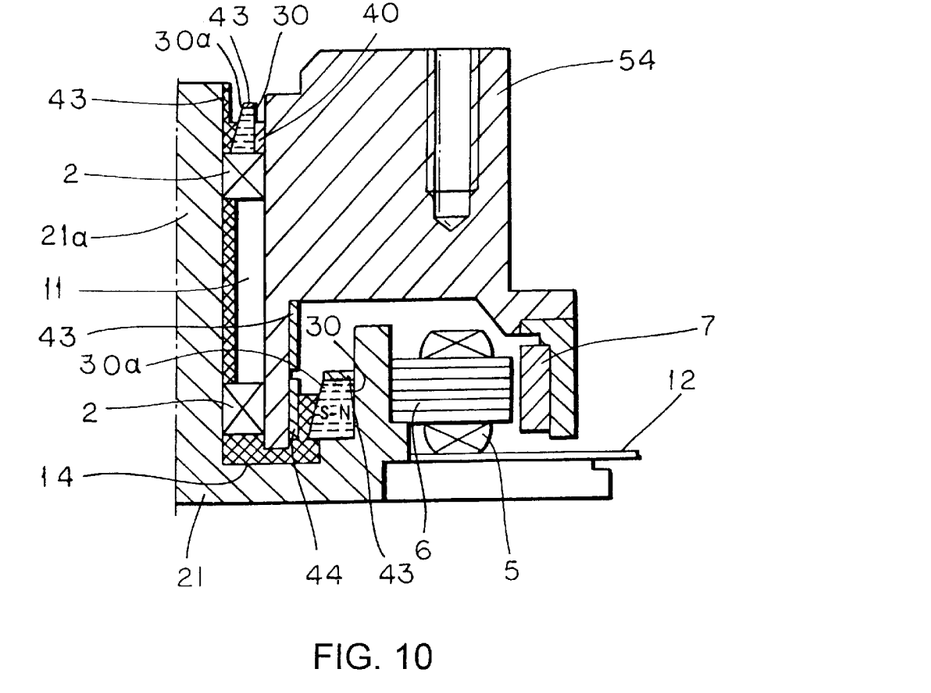
FIG. 10 illustrates a transverse sectional view of the invention according to a seventh embodiment.

FIG. 10 is a transverse sectional view according to a seventh embodiment of the invention. Parts which function identically to those referred to in the sixth embodiment are given like reference numerals and will not be described herein.

In the seventh embodiment, a motor is of the type in which a center shaft 21a is fixed to a frame 21. The frame 21 is made of a magnetic material and has open ends. In order to prevent a magnetic fluid 14 from leaking from the open ends of the frame 21, magnets 30 are positioned closer to the open ends of the frame 21 than radial-slide bearings 2. Also, in order to form the same magnetic circuit as described in the sixth embodiment, the center shaft 21a is placed in a face-to-face relationship with the upper magnet 30, and a member 44 (or hub 54 when the member 44 is not present) is placed in a face-to-face relationship with the lower magnet 30.

As in the sixth embodiment, magnetic-fluid-absorption members 43 are attached to an upper surface of magnets 30, a peripheral surface of the center shaft 21a, or the hub 54. It is apparent that the magnetic-fluid-absorption members 43, when used in the seventh embodiment of the invention, offer the same advantages as when used in the sixth embodiment of the invention as described above. That is, even if the magnetic fluid 14 leaks from the device, the magnetic-fluid-absorption members 43 will absorb that magnetic fluid 14 to prevent any leakage.

There are also many advantages associated with the device described in the seventh embodiment. In particular, as will be described in detail below with reference to FIGS. 14 and 15, the magnetic-fluid-absorption members 43 are effective at absorbing and rapidly solidifying the magnetic fluid 14 and thus effectively prevent leakage of the magnetic fluid 14.

Figure 11:
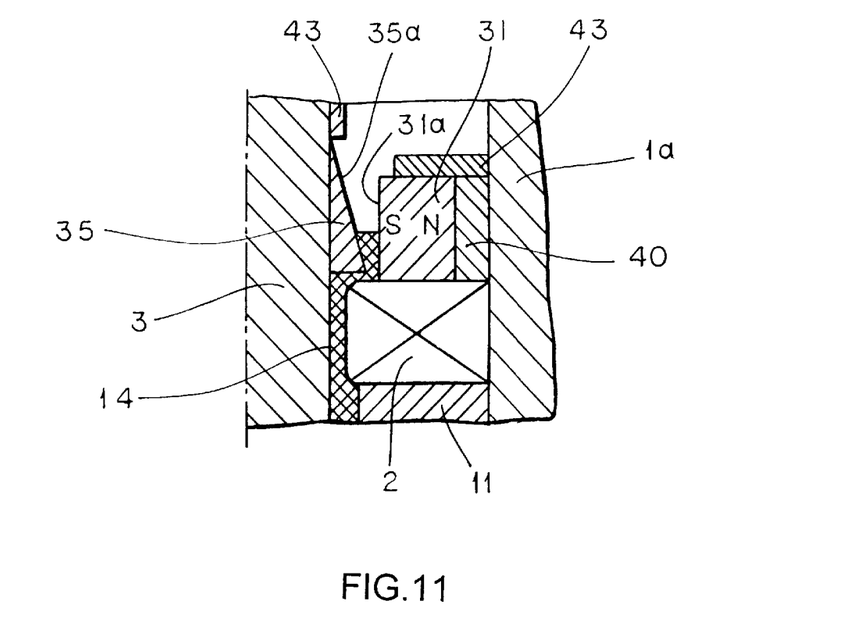
FIG. 11 illustrates a transverse sectional view showing a principal part of the invention according to an eighth embodiment.

FIG. 11 is a transverse sectional view showing a principal part of a device according to an eighth embodiment of the invention. Referring to FIG. 11, one side 31a of a magnet 31, which maintains a face-to-face relationship with a center shaft 3, is not inclined. Instead, a magnetic body 35, which is fixed to an outer-peripheral surface of the center shaft 3 and maintains a face-to-face relationship with the magnet 31, has an outer peripheral surface 35a which inclines toward side 31a of the magnet 31 in a direction away from the open end of the frame 1a or, in other words, a downward direction.

With this arrangement, the magnet 31, the magnetic body 35, the center shaft 3, the upper radial-slide bearing 2, and the retainer 40 collectively form a magnetic circuit. This magnetic circuit provides an axial-magnetic-flux-density gradient in the space between the magnetic body 35 and the magnet 31 which increases unidirectionally in a direction away from the open or upper end of the frame 1a, as in the sixth embodiment. This unidirectional-magnetic-flux-density gradient offers the same advantages as described above for the sixth embodiment.

As in the sixth and seventh embodiments, magnetic-fluid-absorption members 43 are attached to an upper end of the magnet 31 and an outer peripheral surface of the center shaft 3 at a location above the magnet 35. Thus, even if the magnetic fluid 14 leaks from the device, the magnetic-fluid-absorption members 43 absorb that magnetic fluid 14 thereby preventing leakage.

Figure 12:
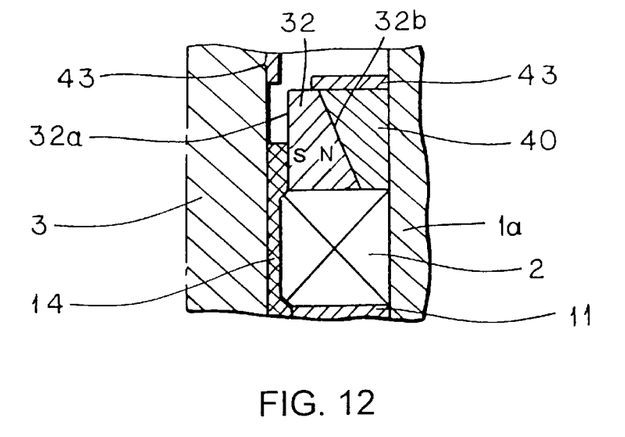
FIG. 12 illustrates a transverse sectional view showing a principal part of the invention according to a ninth embodiment.

FIG. 12 is a transverse sectional view showing a principal part of a ninth embodiment of the present invention. The device of the ninth embodiment differs from that of the sixth embodiment, in that with the ninth embodiment a front side 32a of a magnet 32, which maintains a face-to-face relationship with the center shaft 3, is not inclined. However, a rear side 32b of the magnet 32 is inclined such that a radial thickness of the magnet 32 increases in a direction away from the open end of the frame 1a. Magnetic-fluid-absorption members 43 are provided in the ninth embodiment in the same manner as those provided in the eighth embodiment.

With this arrangement, the magnet 32, the center shaft 3, the radial-slide bearing 2 adjacent to the open end of the frame 1a, and the retainer 40 collectively form a magnetic circuit. This magnetic circuit provides an axial-magnetic-flux-density gradient in a space between the center shaft 3 and the magnet 32 which increases unidirectionally in a direction away from the open end of the frame 1a, as in the sixth embodiment. This unidirectional magnetic-flux-density gradient and magnetic-fluid-absorption members 43 offer the same advantages and benefits as described above for the sixth embodiment.

Figures 13A, 13B:
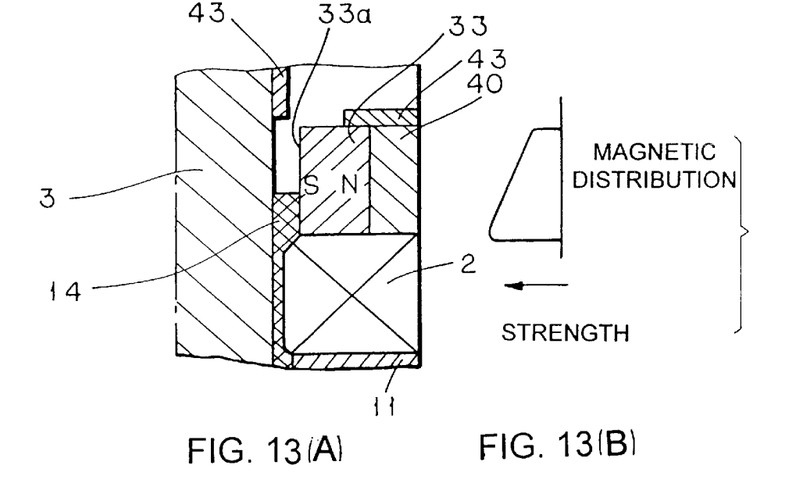
FIGS. 13(a) and 13(b) illustrate a tenth embodiment of the present invention.

FIGS. 13(a) and 13(b) illustrate a tenth embodiment of the present invention. In particular, FIG. 13(a) is a transverse sectional view showing a principal part of the invention according to the tenth embodiment, whereas, FIG. 13(b) illustrates a magnetic distribution of a magnet 33 shown in FIG. 13(a). The device of the tenth embodiment differs from that of the sixth embodiment, in that in the tenth embodiment one side 33a of a magnet 33, which maintains a face-to-face relationship to the center shaft 3, is not inclined. However, the magnetic strength of the magnet 33, increases in a direction away from the open end of the frame. The magnetic-fluid-absorption members 43 are attached in the same manner as in the eighth embodiment. The unidirectional-magnetic-flux-density gradient formed by the tenth embodiment along with the magnetic-fluid-absorption member 43 provide the same advantages and benefits as described above for the sixth embodiment.

Figure 14:
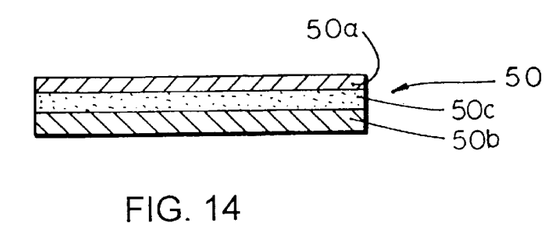
FIG. 14 illustrates a transverse sectional view of magnetic-fluid-absorption members used in the sixth through tenth embodiments.
Figure 15:
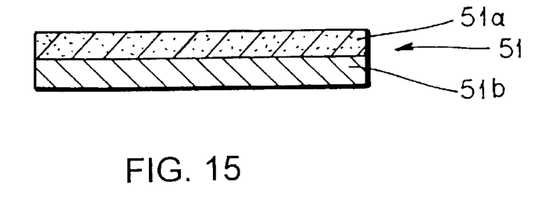
FIG. 15 illustrates a transverse sectional view of magnetic-fluid-absorption members used in the sixth to tenth embodiments.

FIGS. 14 and 15 are transverse sectional views of modified forms of the magnetic-fluid-absorption members 43 as used in the sixth to tenth embodiments.

Referring to FIG. 14, a magnetic-fluid-absorption member 50 includes art outer magnetic-fluid-absorption layer 50a, an inner adhesive layer 50b, and a solidifying layer 50c, which is positioned between the outer magnetic-fluid-absorption layer 50a and the inner adhesive layer 50b. The solidifying layer 50c is made, for example, from a crosslinked polymer of polyacrylic acid resin, an N-benzyloxy-carbonyl-L-valine-valineoctadecylamide related compound, various cyclic dipeptide derivatives, an N-lauroylglutamicaciddibutylamide, and a gelling agent.

Referring to FIG. 15, a magnetic-fluid-absorption member 51 includes a magnetic-fluid-absorption layer 51a including the above-described solidifying agent, and an adhesive layer 51b. Magnetic-fluid-absorption members 50 and 51 rapidly absorb and solidify magnetic fluid if leakage occurs regardless of any magnetic attraction resulting from the unidirectional-magnetic-flux-density gradient. Thus, the magnetic-fluid-absorption members 50 and 51 are known to more effectively prevent leakage of magnetic fluid as compared to the magnetic-fluid absorption members 43 described in the sixth to tenth embodiments.

It is of course to be understood that various changes may be made to sixth through tenth embodiments without departing from the scope of the invention. For example, magnets 30 through 33 as described above may be fixed to the center shaft 3. With respect to the seventh embodiment, the upper magnet 30 may be fixed to the center shaft 21a, and the lower magnet 30 may be fixed to the hub 54. Also, a magnetic body may be mounted near magnets 30 through 33 in a manner such that the magnetic body will face magnets 30 through 33.

Moreover, in the sixth through tenth embodiments, the magnetic-fluid-absorption members 43, 50 and 51, which operate as a means for collecting fluids, are mounted in the passage 10 adjacent to a unidirectional-magnetic-flux-density gradient seal structure. Although this location is considered to be an effective location in which to place the magnetic-fluid-absorption members 43, 50 and 51, the invention is not limited thereto. Also, the number of the magnetic-fluid-absorption members 43, 50 and 51 may vary.

Additionally, the sixth through tenth embodiments employ dynamic pressure type bearings. However, these embodiments may employ other types of bearings. Similiarly, the sixth through tenth embodiments are described as being incorporated into a hard disk drive spindle motor. However, these embodiments may be applied to a polygon-mirror motor for a laser-beam printer, an MO motor or other motors.

Figure 18:
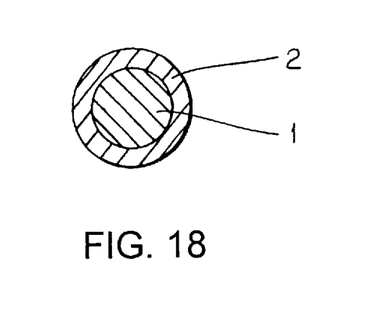
FIG. 18 illustrates a sectional view of a fibrous structure used in a magnetic-fluid-absorption member.
Figure 19:
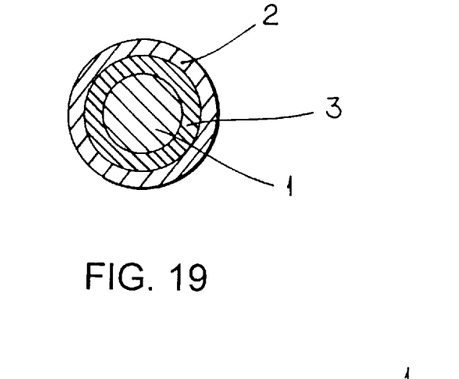
FIG. 19 illustrates a sectional view of a fibrous structure used in a magnetic-fluid-absorption member.
Figure 20:
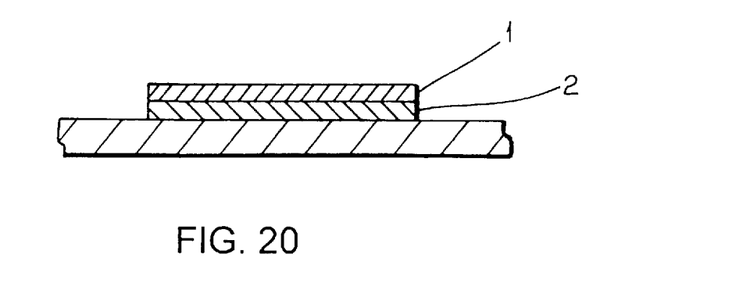
FIG. 20 illustrates a sectional view of a fabric used in a magnetic-fluid-absorption member.

Magnetic-fluid-absorption members are generally composed of fabrics or fibrous bodies. FIGS. 18–20 are sectional views of various embodiments of a magnetic-fluid-absorption member.

Referring to FIG. 18, a fibrous body is shown which includes an inner layer 1 having the function of absorbing a lubricant, and an outer layer 2 having the function of adhering to a surface. The outer layer 2 is formed by a coating which is applied to the inner layer 1. Additionally, the outer layer 2 is designed to have a melting point which is lower than that of the inner layer 1.

The inner layer 1 is of a material such as polypropylene, polyethylene, polystyrene, nylon, or vinyl chloride resin. In the event the inner layer 1 is made of polypropylene, the outer layer 2 is made of polyethylene, nylon, or polyurethane resin.

A magnetic-fluid-absorption member made of the fibrous body shown in FIG. 18 can be secured without being impregnated with an adhesive, since the magnetic-fluid-absorption member has the property of adhering to a surface as well as the property of absorbing a lubricant. Heat is generally employed for causing a magnetic-fluid absorption member to adhere to a surface. As such, being that the outer layer 2 has melting point lower than that of the inner layer 1, when a magnetic-fluid-absorption member is heated, the outer layer 2 melts and adheres to a desired surface while the inner layer 1 does not melt and maintains its lubricant-absorbing function.

FIG. 19 shows another embodiment of a fibrous body used in the magnetic-fluid-absorbing members 43, 50 and 51. As shown in FIG. 19, an intermediate layer 3 is provided between an inner-absorbing layer 1 and an outer-adhering layer 2. The intermediate layer 3 may be made of a material for absorbing a lubricant, a material for adhering to a surface, or may be a metal.

The fibrous bodies described in FIGS. 18 and 19 may also be constructed of four or more layers, constitute a structure other than one formed by a plurality of layers, or constitute a structure other than one formed by layers of fabrics, so long as the fibrous body has the properties of absorbing a lubricant and adhering to a surface.

FIG. 20 shows an embodiment of a fabric having an appropriate fibrous body which is used in magnetic-fluid-absorbing members 43, 50 and 51. Referring to FIG. 20, the fabric includes an absorbing layer 1 having the function of absorbing an oil, and an adhering layer 2 having the function of adhering to a surface. The adhering layer 2 is formed by a coating which is applied to the absorbing layer 1.

The absorbing layer 1 is, for example, made of an unwoven fabric to absorb a large amount of fluid, while the adhering layer 2 is, for example, made of a sheet, or unwoven fabric. The adhering layer 2 is designed to have a melting point which is lower than that of the absorbing layer 1. In particular, the absorbing layer 1 is generally made of a material such as polypropylene, polyethylene, polystyrene, nylon or a vinyl chloride resin. In the event the absorbing layer 1 is of polypropylene, the adhering layer 2 will be made of polyethylene, nylon, or polyurethane resin.

A magnetic-fluid-absorption member made of the fabric shown in FIG. 20 can be secured without being impregnated with an adhesive, since the magnetic-fluid-absorption member has the property of adhering to a surface as well as the property of absorbing a lubricant. Heat is generally employed for causing a magnetic-fluid absorption member to adhere to a surface. As such, being that the adhering layer 2 has a melting point lower than that of the absorbing layer 1, when a magnetic-fluid-absorption member is heated, the adhering layer 2 melts and adheres to a desired surface while the adhering layer 1 does not melt and maintains its lubricant-absorbing function.

Figure 21:
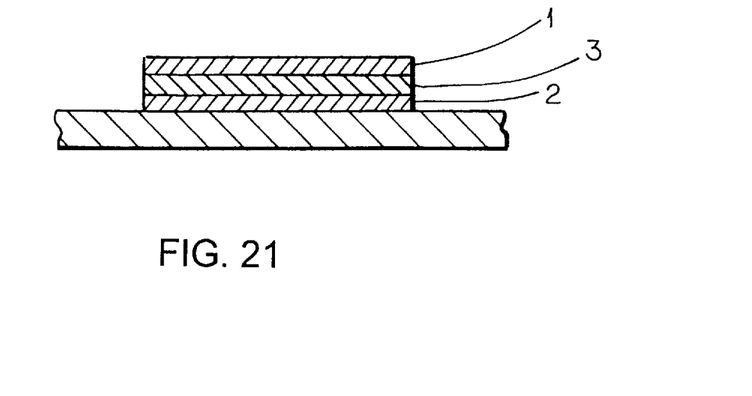
FIG. 21 illustrates a sectional view of a fabric used in a magnetic-fluid-absorption member.

FIG. 21 shows another embodiment of a fabric having an appropriate fibrous body which is used in magnetic-fluid-absorbing members 43, 50 and 51. As shown in FIG. 21, an intermediate layer 3 is placed between the absorbing layer 1 and the adhering layer 2. The intermediate layer 3 may be made of a material for absorbing an oil, a material for adhering to a surface, or a material having a melting point which is higher than those of the absorbing layer 1 and adhering layer 2. Intermediate layer 3 may, for example, also be formed from a metal sheet, such as stainless steel, SUS 430, SUS 420, or aluminum. By using a metal sheet for the intermediate layer 3, the mechanical strength of the magnetic-fluid-absorbing member is improved. Also, use of the metal sheet allows the magnetic-fluid-absorbing member to (i) have an improved property of retaining its shape during machining, such as press forming or bonding, (ii) have an improved dimensional and positional accuracy, and (iii) have a reduced size.

The magnetic-fluid-absorption members described in FIGS. 20 and 21 may also have a layer structure formed by four or more layers, or a structure other than a layer structure, if the magnetic-fluid-absorption members perform both the function of absorbing an oily fluid and the function of adhering to a surface.

The present invention is not to be considered limited in scope by the preferred embodiments described in the specification. Additional advantages and modifications, which will readily occur to those skilled in the art from consideration of the specification and practice of the invention, are intended to be within the scope and spirit of the following claims.

We claim:

1. A sealing device for use in a motor, where said motor includes a shaft and a frame that are interconnected by a bearing, said sealing device comprising:
    magnetic-fluid-sealing means for sealing said bearing to prevent magnetic fluid retained by said bearing from escaping from said bearing; and
    a magnetic fluid absorption member for absorbing fluids which may escape said magnetic-fluid-sealing means, said magnetic fluid absorption member being held out of contact with said magnetic fluid retained by said bearing.

2. The sealing device as defined in claim 1, wherein:

said shaft, frame, and bearing are made of magnetically permeable material; and, said magnetic-fluid-sealing means includes a magnet.

3. The sealing device as defined in claim 2, wherein said magnetic fluid absorption member is attached to at least one of an upper surface of said magnet, a peripheral surface of said shaft, and said frame above said magnet.

4. The sealing device as defined in claim 2, wherein said magnetic fluid absorption member is designed to absorb oil and is an unwoven fabric made of at least one of polypropylene, polyester, polyethylene, polystyrene, nylon, polyurethane, and vinyl chloride.

5. The sealing device as defined in claim 2, wherein said magnetic fluid absorption member further includes:

a first portion which is designed to absorb oil, said first portion being an unwoven fabric made of at least one of polypropylene, polyester, polyethylene, polystyrene, nylon, polyurethane, and vinyl chloride; and, a second portion which is an adhesive layer.

6. The sealing device as defined in claim 2, wherein said magnetic fluid absorption member further includes:

a first portion which is designed absorb oil, said first portion being an unwoven fabric made of at least one of polypropylene, polyester, polyethylene, polystyrene, nylon, polyurethane, and vinyl chloride;

a second portion which is designed to solidify oil, said second portion being made of least one of a crosslinked polymer of polyacrylic acid resin, an N-benzyloxy-carbonyl-L-valine-valine-valineoctadecylamide related compound, a cyclic dipeptide derivative, an N-lauroylglutamicaciddibutylamide, and a gelling agent; and, a third portion which is an adhesive layer.

7. The sealing device as defined in claim 1, wherein said magnetic fluid absorption member further includes:

a first portion which is an oil absorbing layer; and, a second portion which is an adhesive layer.

8. The sealing device as defined in claim 7, wherein said second portion has a melting point which is lower than a melting point of said first portion.

9. The sealing device as defined in claim 7, wherein said first portion is a material made of at least one of polypropylene, polyethylene, polystyrene, nylon, and vinyl chloride resin.

10. The sealing device defined in claim 7 wherein:

said first portion is a material made of polypropylene; and, said second portion is a material made of at least one of polyethylene, nylon, and polyurethane resin.

11. The sealing device as defined in claim 1, wherein said magnetic fluid absorption member further includes:

a first portion which is an oil absorbing layer;

a second portion which is an adhesive layer; and a third portion which is positioned between said first and second portions.

12. The sealing device as defined in claim 11, wherein said third portion includes at least one of an oil absorbing material, an adhesive material, and a metal material.

13. The sealing device as defined in claim 11, wherein said third portion comprises at least one of stainless steel, SUS 430, SUS 420, and aluminum.

14. The sealing device as defined in claim 1, wherein said magnetic-fluid-sealing means includes:

a first plate;

a second plate; and, a magnet which is securely fitted between said first and second plates, wherein said magnetic fluid is formed to hold a seal between said first and second plates and said shaft.

15. The sealing device as defined in a claim 14, wherein said magnetic fluid absorption member is designed to absorb oil and is an unwoven fabric made of at least one of polypropylene, polyethylene, and polystyrene.

16. The sealing device as defined in claim 14, wherein said magnetic fluid absorption member is designed to solidify oil and is poly long-chain acyrl acrylate.

17. The sealing device as defined in claim 14, wherein said magnetic fluid absorption member is attached to an upper surface of said first plate and on said frame above said first plate.

18. The sealing device as defined in claim 17, wherein an oil repellent is placed on at least one of said shaft, said first plate, and said frame.

19. The sealing device as defined in claim 18, wherein said oil repellant is a fluorine compound.

20. The sealing device as defined in claim 14, wherein said magnetic fluid absorption member further includes:

a first portion which is designed to absorb oil and is unwoven fabric made of at least one of polypropylene, polyethylene, and polystyrene; and, a second portion which is designed to solidify oil an is a poly long-chain acryl acrylate.

* * * * *